United States Patent
Liu et al.

(10) Patent No.: US 6,434,382 B2
(45) Date of Patent: Aug. 13, 2002

(54) CELLULAR CALL PROCESSOR HAVING CONCURRENT INSTANCES OF CALL MODELS TO SUPPORT MIXED MEDIA COMMUNICATION CONNECTIONS

(75) Inventors: Chung-Zin Liu, Naperville; Jin Wang, Lisle, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/803,860

(22) Filed: Mar. 12, 2001

Related U.S. Application Data

(62) Division of application No. 09/123,179, filed on Jul. 27, 1998.

(51) Int. Cl.[7] .............................................. H04Q 7/20
(52) U.S. Cl. ...................... 455/426; 455/445; 455/450; 455/509
(58) Field of Search ........................... 455/426, 560, 455/445, 450, 552, 422, 451, 466, 509, 512, 524, 517, 556, 557; 370/395, 410, 401, 466, 467

(56) References Cited

U.S. PATENT DOCUMENTS

| | | | |
|---|---|---|---|
| 5,537,436 A | * | 7/1996 | Bottoms et al. ............ 375/222 |
| 5,590,406 A | * | 12/1996 | Bayley et al. ............. 455/54.2 |
| 5,838,768 A | | 11/1998 | Sumar et al. |
| 5,901,352 A | * | 5/1999 | St-Pierre et al. ............ 455/426 |
| 5,970,416 A | | 10/1999 | Ablay et al. |
| 6,023,474 A | | 2/2000 | Gardner et al. |
| 6,028,892 A | * | 2/2000 | Barabash et al. ........... 375/222 |
| 6,112,084 A | | 8/2000 | Sicher et al. |

* cited by examiner

Primary Examiner—Lee Nguyen
(74) Attorney, Agent, or Firm—Patton Boggs, LLP

(57) ABSTRACT

The cellular call processor having concurrent instances of call models supports mixed media communication connections. The cellular call processor processes each of the media components of the mixed media communication connection in an independent, yet coordinated manner. Thus, each of the media components of the mixed media communication connection can be processed in an efficient media-specific manner and even directed to different destinations. The cellular call processor can implement this capability in a plurality of ways, one of which is to maintain the existing voice call model and create a new call model for each of the other call components in a media-specific manner. Alternatively, multiple instances of the same call model can be used, with each call component being served by a separate instance of the call processing code. Communications among the various instances of the call models occur only at the call setup and release and the call models can be implemented in the same physical network element or can be implemented in separate network elements that are customized for the type of call component being processed.

18 Claims, 3 Drawing Sheets

CELLULAR CALL PROCESSOR HAVING CONCURRENT INSTANCES OF CALL MODELS TO SUPPORT MIXED MEDIA COMMUNICATION CONNECTIONS

CROSS-REFERENCE TO RELATED APPLICATIONS

This application is a division application of U.S. patent application Ser. No.: 09/123,179, filed Jul. 27, 1998 and titled "Cellular Call Processor Having Concurrent Instances of Call Models to Support Mixed Media Communication Connections".

FIELD OF THE INVENTION

This invention relates to cellular communication systems and, in particular, to a cellular call processing system that uses multiple concurrently active instances of call models to process calls that comprise mixed media communications connections.

Problem

The problem with existing cellular communication systems is that they support either a voice only or a data only communication application. In addition, the existing cellular communication systems are not adapted to handle multiple media connections or simultaneous communication connections to multiple endpoints. Therefore, the existing cellular communication systems are not adapted to the communications needs of customers who are equipped with modern communication terminal devices.

Solution

The above described problems are solved and a technical advance achieved by the present cellular call processor that uses multiple concurrently active instances of call models to process calls that comprise mixed media communications connections. The cellular call processor processes each of the media components of the mixed media communication connection in an independent, yet coordinated manner. Thus, each of the media components of the mixed media communication connection can be processed in an efficient media-specific manner and even directed to different destinations. The cellular call processor can implement this capability in a plurality of ways, one of which is to maintain the existing voice call model and create a new call model for each of the other call components in a media-specific manner. Alternatively, multiple instances of the same call model can be used, with each call component being served by a separate instance of the call processing code. Same set of call processing codes also could have multiple call models, instances of different call models could be run from the same set of codes. Communications among the various instances of the call models occur only at the call setup and release, and the call models can be implemented in the same physical network element or can be implemented in separate network elements that are customized for the type of call component being processed.

DETAILED DESCRIPTION

Cellular Communication Network Architecture

Figure 2:
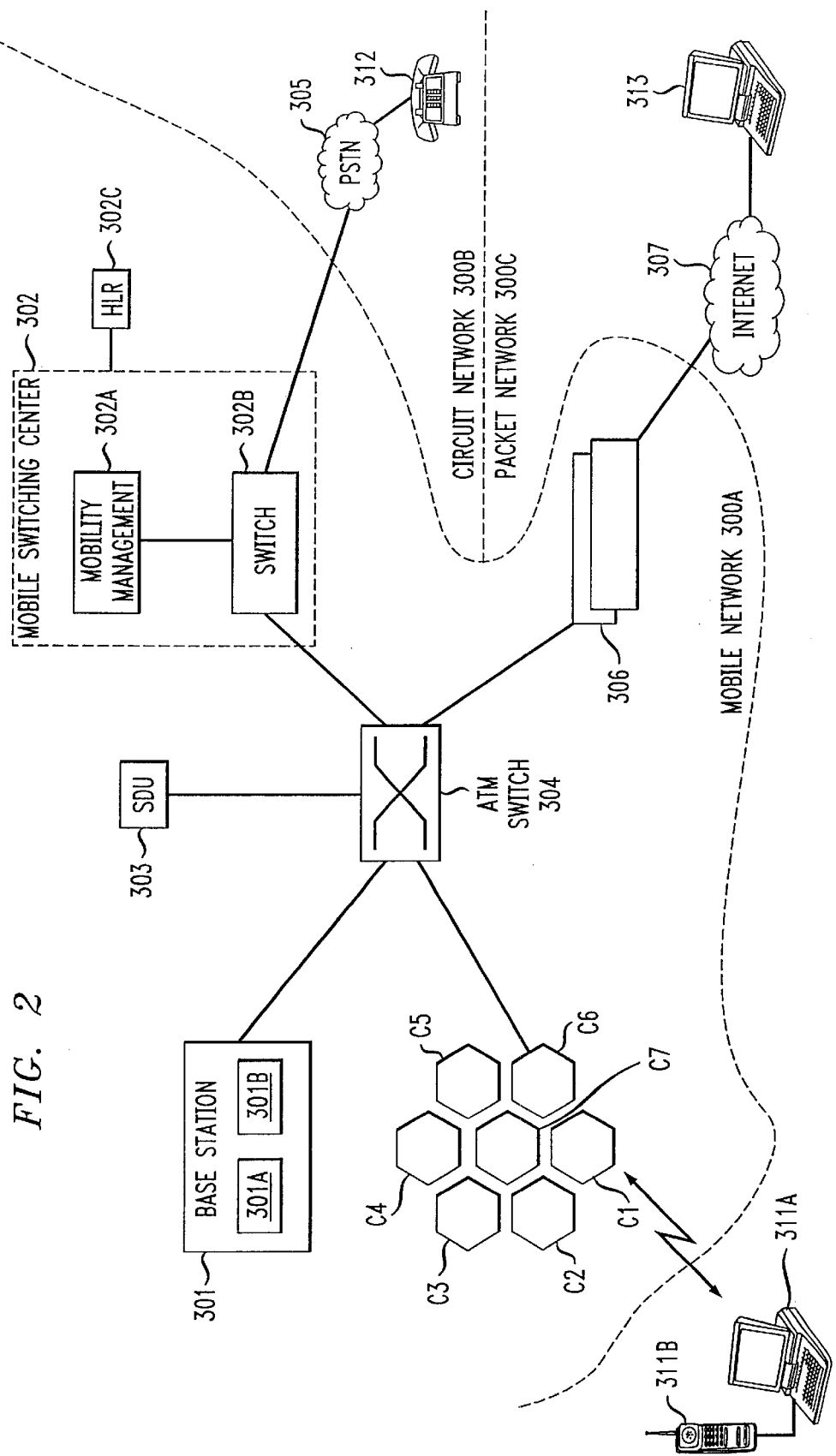
FIG. 2 illustrates in block diagram form the overall network architecture of a cellular communication system that incorporates the present cellular call processor having concurrent instances of call models to support mixed media communication connections.

FIG. 2 illustrates in block diagram form the overall network architecture of a cellular communication system (using CDMA technology as but one example of the present system concept) that incorporates the present cellular call processor having concurrent instances of call models to support mixed media communication connections. The cellular communication system 300A is connected to both a circuit network 300B and a packet network 300C to thereby interconnect subscribers that are served by this collection of networks. The cellular communication system 300A comprises a number of components that serve to locate, identify and provide communication services for a plurality of mobile subscriber stations (such as mobile subscriber station 311) that are operational in the radio coverage area of the cellular communication system 300A. In particular, a Mobile Switching Center (MSC) 302 serves at least one and more typically a plurality of base stations 301. Each base station 301 is interconnected with a plurality of cell sites C1–C7 that are equipped with the wireless transmitters and receivers that provide the wireless communication links to the mobile subscriber stations, such as mobile subscriber station 311, that are operational in the radio coverage area of the cell site C1. A Selection/Distribution Unit (SDU) 303 is provided to manage the frame selection and multiplexing functions of the radio channel allocation in the cell sites C1–C7 and implement the call direction function. Finally, the data interworking function 306 functions as an interface between the cellular communication system 300A and a data transport network, such as the Internet 307. The collection of elements used to implement the cellular communication system 300A illustrated in FIG. 2 can be implemented as separate units, interconnected via a data communication switching element, such as Asynchronous Transfer Mode switching system 304, or can be combined into a lesser number of components.

In this cellular communication system, the SDU 303 is the entity that communicates with the Mobile Switching Center 302 via the industry standard IS-634 A1 signaling messages. Base station 301 is the origination and termination point for all air interface signaling layer 3 messages and is also the entity responsible for providing the air interface with the mobile subscriber stations 311. The base station 301 comprises two components: radio control component 301A and channel management component 301B. The processing of call originations and call terminations between the mobile subscriber stations 311 and the cellular communication system 300A are well known in concept and defined by signaling standards that are promulgated by various industry standards organizations. The specific details of such call and signal processing are disclosed herein only to the extent necessary to understand the concepts of the present cellular call processor.

Cellular Call Processor

Figure 1:
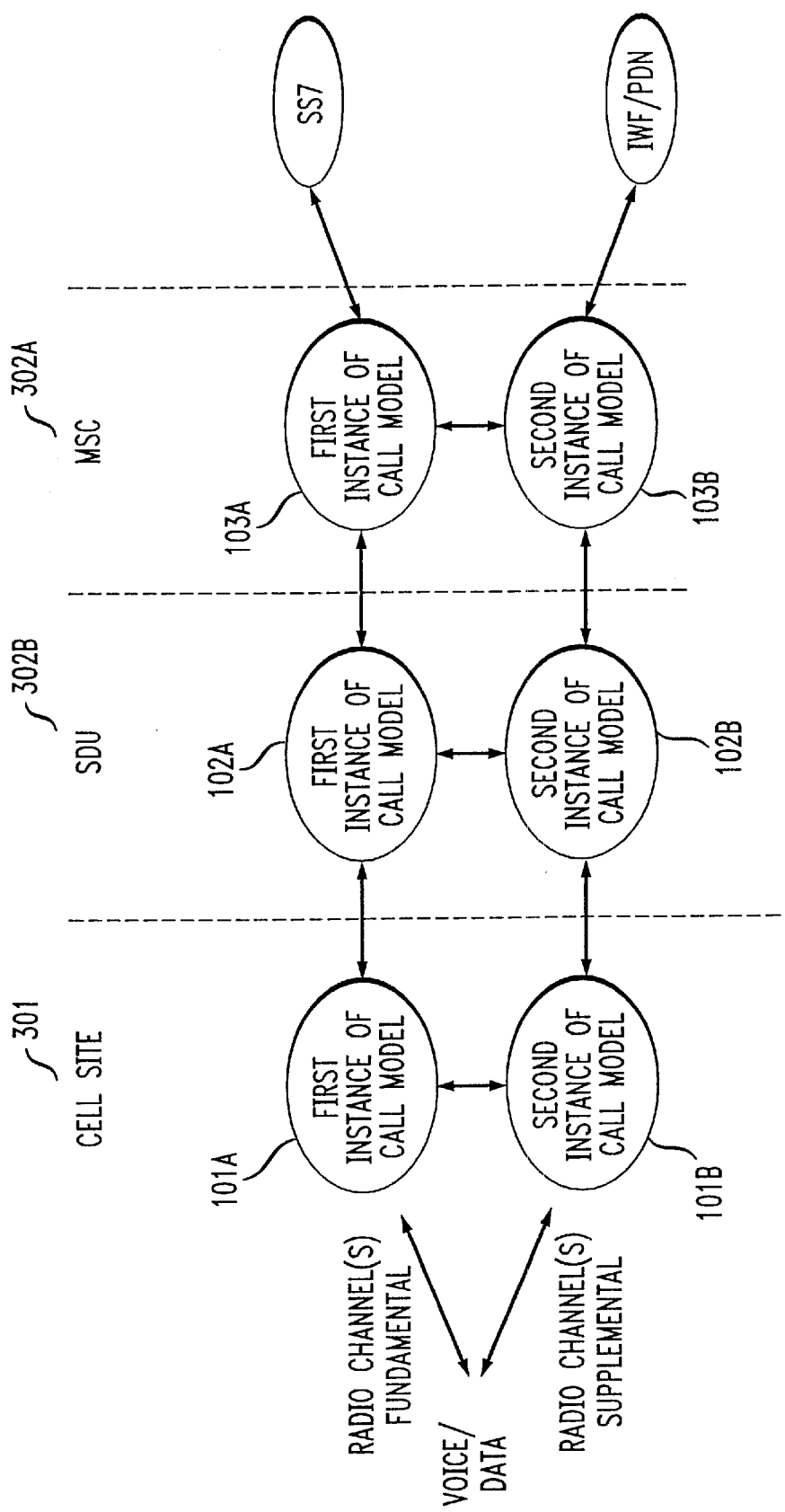
FIG. 1 illustrates in block diagram form the overall architecture of the present cellular call processor having concurrent instances of call models to support mixed media communication connections.

FIG. 1 illustrates in block diagram form the overall architecture of the present cellular call processor having concurrent instances of call models to support mixed media communication connections. In particular, the case where the cellular communication connection comprising a voice and data call is illustrated. The cellular call processor, in the sense used herein, comprises a number of cooperatively operative processes 101–103 that are located in the various components of the cellular communication system 300A described above. The cellular call processor can be implemented in various ways, and the particular implementation disclosed herein is selected to be illustrative of the concept of the invention and is not intended to limit the applicability of the concept to other implementations that represent variations of this concept.

The cellular call processor comprises processes 101–103 that execute in the various components 301, 302 of the cellular communication system 300A illustrated in FIG. 2. The most pertinent ones of these processes comprise the call model 101 extant in the base station 301 and implemented in radio control component 301A; the call model 102 extant in the switch control process 302B in the mobile switching center 302; and the call model 103 extant in the mobility management process 302A in the mobile switching center 302. Each of these processes 101–103 is an existing cellular communication process found in cellular communication systems. The present cellular call processor replicates these processes by creating multiple instances of the processes to thereby process each call component independently, yet have the multiple call components of a communication connection cooperatively processed.

Operation of the Cellular Call Processor

The typical cellular call instance is where a mobile subscriber at a mobile subscriber station 311 initiates a voice cellular call in the traditional manner. The cellular call processor initiates a first instance 101A–103A of each of the call models 101–103 that are used to establish the cellular communication connection. The first instance 101A–103A of each call model uses the standard call model, since the call that was originated was a voice call. The call appearance is also given a reference ID that comprises an identification indicia that is associated with this call appearance. The reference ID is maintained in the mobile switching center 302, but is also stored in the mobile subscriber station 311.

During the establishment of this call, or after the basic voice call is established, the mobile subscriber activates mixed media communication service. This mixed media communication service can be any combination of the types of media (loosely termed data) communications and/or voice communications, including, but not limited to: E-Mail upload, WEB surfing, file transfers, analog or digital fax, packet telephone, graphics, video, additional voice calls, and the like. The mobile subscriber station 311 can direct the mixed media communications to a single destination 307 where the various data connections are managed independent of the cellular communication network 300A or the subscriber can individually route the mixed media communication components to different destinations 312, 313. For example, the video and voice components can be received from a mixed media conference system with the subscriber at station 312, while there is a concurrently active data file transfer operation underway via the Internet 307 that is independent of the mixed media conference. Furthermore, E-Mail transfers can be executing as a background process on the Internet connection. Thus, the mobile subscriber can manage what is presently viewed as multiple communication connections in a single cellular communication session. The management of these multiple call components is effected by the use of multiple instances of call models. For example, in the case where the subscriber at mobile subscriber station 311 requests a data communication connection to the Internet 307, the reference ID for this call appearance is used to activate a second instance of the call models 101B–103B to thereby process the data call component of this call connection. The second instance of the call models 101B–103B can be identical to the first instance of the call models 101A–103A, or they can be customized versions of the first instance of the call models 101A–103A to specifically process data calls.

Figure 3:
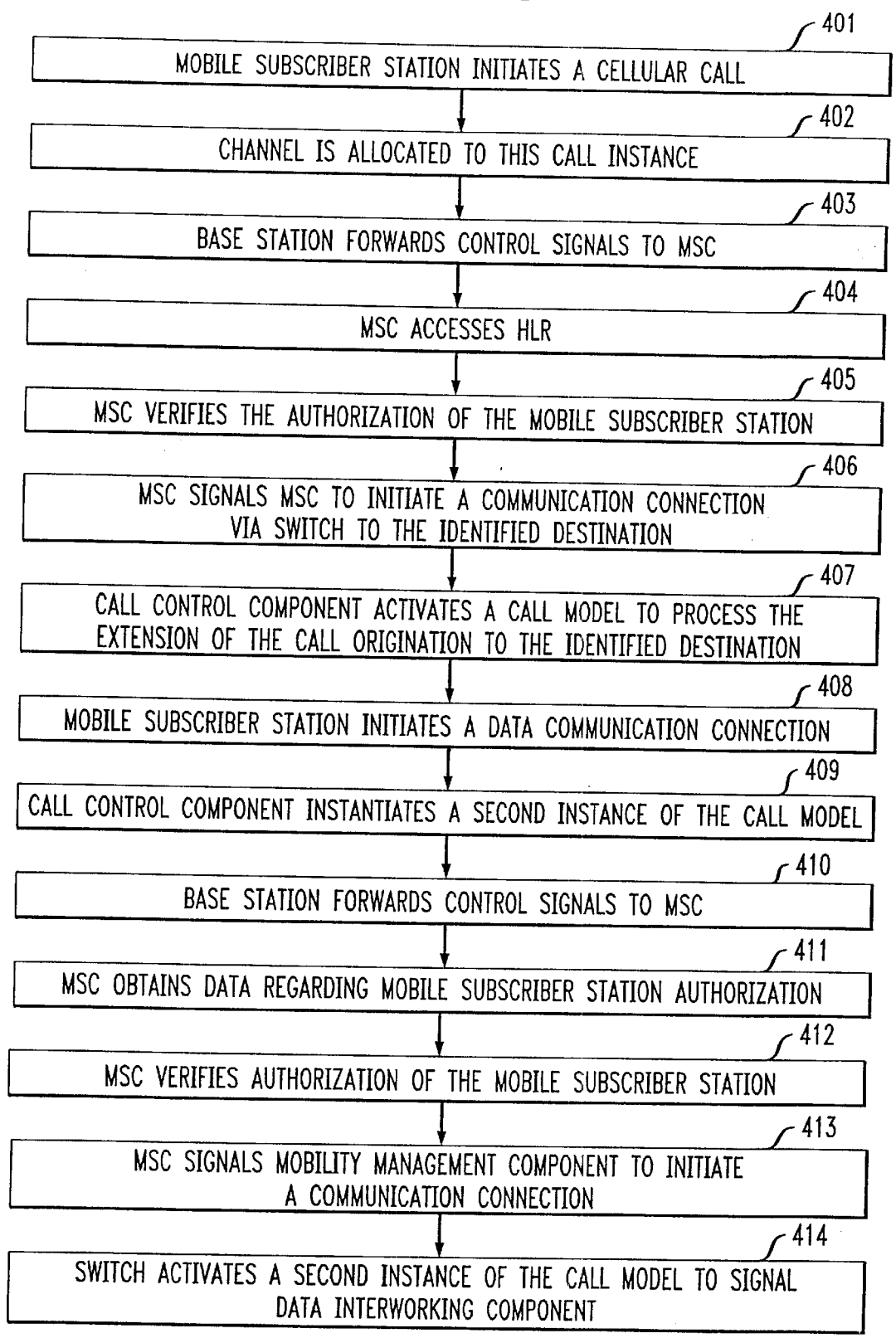
FIG. 3 illustrates in flow diagram form the operation of the cellular communication system that incorporates the present cellular call processor having concurrent instances of call models to support mixed media communication connections.

FIG. 3 illustrates in flow diagram form the operation of the cellular communication system 300A that incorporates the present cellular call processor having concurrent call models to support mixed media communication connections. At step 401, the mobile subscriber at mobile subscriber station 311 initiates a voice cellular call in a well known fashion. The mobile subscriber station 311 initiates radio communication with the base station 301 via one or more of the serving cell sites C1. At step 402, a fundamental radio channel in the radio communication spectrum is allocated to this call instance. and, in the case of CDMA communications, a predefined code is allocated for this communication connection. The base station 301 comprises two components: radio control component 301A and channel management component 301B. The channel management component 301B manages the assignment of radio communication channels to mobile subscriber station 311 and the maintenance of these communication channels as the mobile subscriber station 311 moves among the cell sites C1–C7. Therefore, the call model 101A in the radio control component 301A allocates the resources necessary to implement the communication connection at step 402. The call model 101A defines the originating party, subscriber locator encoder, the CDMA code for the communication channel, and the radio link protocol. At step 403, the base station 301 forwards control signals to the mobile switching center 302 indicative of the call origination that was initiated by mobile subscriber station 311.

The mobile switching center 302 determines the authorization of the mobile subscriber station to obtain the requested service at step 404 by accessing the Home Location Register (HLR) 302C. The nature of the media requested by the call can also be determined by use of the home location register 302C. In particular, the subscriber provision number that is stored in the home location register 302C can be used to define the modes of communication that are available for the mobile subscriber. The subscriber provision number can define the call as voice only, voice/data, data only, or any type of mixed media. In addition, the subscriber provision number can be used to identify the mode of originating and receiving these call components, such as automatic extension of service on an incoming call component within the set of authorized types of call components. At step 405, the mobile switching center 302 verifies the authorization of the mobile subscriber station 311 to receive the requested service and at step 406 activates the call control component 302A to initiate a communication connection via switch 302B to the identified destination, subscriber 312. This communication connection is effected at step 407 by mobility management component 302A activating a first instance of call model 102A to process the extension of the call origination to the identified destination. In addition, switch 302B activates a first instance of call model 103A to originate the communication connection and associated signaling to Public Switched Telephone Network (PSTN) 305 to extend the call connection to the identified destination, telephone station set 312.

In the case where the mobile subscriber at mobile subscriber station 311 additionally initiates a data communication connection, of one or more of the types noted above, at step 408, the call control component 301A at step 409 instantiates a second instance of the call model 101B (call processing process) to process this newly received request. The second instance of the call model 101B can be either identical to the first (voice) instance of call model 101A, or can be customized to correspond to the nature of the media destined to be transmitted over the newly allocated channel. For instance, one way to process a data call is to allocate supplemental radio channel(s) on demand. In either case, the call processing for the second instance of the call model 101B proceeds as described above with respect to the first instance of call model 101A in terms of operation of the base station 301 and the mobile switching center 302. In particular, the base station 301 at step 410 forwards control signals to the mobile switching center 302 indicative of the call origination that was initiated by mobile subscriber station 311. The mobile switching center 302 obtains data regarding the authorizations of the mobile subscriber station 311 at step 411 and at step 412 the mobile switching center 302 verifies the authorization of the mobile subscriber station 311 to receive the requested service and at step 413 activates the mobility management component 302A to initiate a communication connection via switch 302B. This communication connection is effected at step 414 by switch 302B activating a second instance 102B of the call model 102A that was used to implement the original voice communication connection to the subscriber at telephone station set 312. Additionally, the mobility management component 302A initiates a second instance 103B of the call model 103A that was used to implement the original voice communication connection to the subscriber at telephone station set 312. These second instances of the call models signal data interworking component 306 via the ATM switch 304 to extend the call connection to the identified destination, terminal device 313 via a data transport network, such as the Internet 307. Thus, the two call components can be directed to different destinations.

In the case where the multiple call components are directed to a single destination, the issue of coordination of voice and data calls is addressed via the use of the reference ID of the originating subscriber. The reference ID is the identification associated with a call appearance and is maintained by the mobile switching center 302, but this data is also stored in the mobile subscriber unit independent of the call model instance. When a communication connection is established through the cellular communication system 300A, the reference ID of the originating subscriber is forwarded along with the call origination control messages. The mobile number is the key identified in mobile systems and the associated call identification data defines the type of service. Thus, when a call arrives at destination 312 after the original communication connection is established, the reference ID of the originating subscriber provides an indication that the presently arriving and the already established communication connections are associated and should be concurrently implemented.

There are a number of alternative modes of establishing mixed media communication connections that are variations of the above-described example. The subscriber can initiate a data communication connection, then request the establishment of a concurrently active voice call connection. The subscriber can also receive a voice call connection while presently active on a data communication connection. Each of these additional examples represent alternative modes that can be addressed by the above-described cellular call processor concept using the multiple instances of call models as described above.

Summary

The cellular call processor processes each of the media components of the mixed media communication connection in an independent, yet coordinated manner. Thus, each of the media components of the mixed media communication connection can be processed in an efficient media-specific manner and even directed to different destinations. The cellular call processor can implement this capability in a plurality of ways, one of which is to maintain the existing voice call model and create a new call model for each of the other call components in a media-specific manner. Alternatively, multiple instances of the same call model can be used, with each call component being served by a separate instance of the call processing code.

What is claimed:

1. A cellular communication system for establishing a multi-media communication connection for a selected mobile subscriber station to implement multi-media communications with another subscriber station, comprising:

means, responsive to initiation of a multi-media communication connection, having a plurality of media components, for said selected mobile subscriber station, for initiating a plurality of concurrently active call models in a controller of said cellular communication system, each of said plurality of concurrently active call models serving a one of said plurality of media components and each of said plurality of concurrently active call models operating independent of others of said plurality of concurrently active call models;

means for establishing a communication connection between said selected mobile subscriber station and said another subscriber station for each of said concurrently active call models to form a plurality of simultaneous communication connections, each of said plurality of simultaneous communication connections serving a one of said plurality of media components served by an associated call model; and means for processing each of said plurality of call models substantially independent of others of said plurality of call models to establish said plurality of simultaneous communication connections to serve said selected mobile subscriber station.

2. The cellular communication system of claim 1 wherein said means for initiating comprises:

means, responsive to control signals received from said selected mobile subscriber station identifying a desired plurality of call components, for identifying ones of said plurality of call models required to service said desired plurality of call components; and means for instantiating said identified ones of said plurality of call models.

3. The cellular communication system of claim 2 wherein said means for initiating further comprises:

means for associating a one of said identified ones of said plurality of call models with a corresponding one of said desired plurality of call components.

4. The cellular communication system of claim 3 wherein said means for processing comprises:

means for establishing a plurality of radio communication channels between said selected mobile subscriber station and at least one base station in said cellular communication system.

5. The cellular communication system of claim 4 wherein said means for processing further comprises:

means for assigning each of said radio communication channels to a corresponding one of said desired plurality of call components.

6. The cellular communication system of claim 1 wherein said means for processing comprises:

means for establishing a plurality of radio communication channels between said selected mobile subscriber station and at least one base station in said cellular communication system.

7. The cellular communication system of claim 6 wherein said means for processing further comprises:

means for assigning each of said radio communication channels to a corresponding one of said plurality of call components.

8. The cellular communication system of claim 1 wherein said cellular communication system is connected to a plurality of switching systems, each of which serves to transmit data of a predetermined type, said means for processing comprises:

means for selecting a one of said plurality of said plurality of switching systems for each of said plurality of call components to establish said plurality of simultaneous communication connections; and means for interconnecting each of said call components from said selected mobile subscriber station to a corresponding selected one of said plurality of said plurality of switching systems.

9. The cellular communication system of claim 1 wherein said means for processing comprises:

means for determining a destination for each of a plurality of voice communication connections; and means for initiating establishment of said plurality of communication connections to said destination for each of said plurality of voice communication connections.

10. A method of operating a cellular communication system for establishing a multi-media communication connection for a selected mobile subscriber station to implement multi-media communications with another subscriber station, comprising the steps of:

initiating, in response to initiation of a multi-media communication connection, having a plurality of media components, for said selected mobile subscriber station, a plurality of concurrently active call models in a controller of said cellular communication system, each of said plurality of concurrently active call models serving a one of said plurality of media components and each of said plurality of concurrently active call models operating independent of others of said plurality of concurrently active call models;

establishing a communication connection between said selected mobile subscriber station and said another subscriber station for each of said concurrently active call models to form a plurality of simultaneous communication connections, each of said plurality of simultaneous communication connections serving a one of said plurality of media components served by an associated call model; and processing each of said plurality of call models substantially independent of others of said plurality of call models to establish said plurality of simultaneous communication connections to serve said selected mobile subscriber station.

11. The method of operating a cellular communication system of claim 10 wherein said step of initiating comprises:

identifying, in response to control signals received from said selected mobile subscriber station identifying a desired plurality of call components, ones of said plurality of call models required to service said desired plurality of call components; and instantiating said identified ones of said plurality of call models.

12. The method of operating a cellular communication system of claim 11 wherein said step of initiating further comprises:

associating a one of said identified ones of said plurality of call models with a corresponding one of said desired plurality of call components.

13. The method of operating a cellular communication system of claim 12 wherein said step of processing comprises:

establishing a plurality of radio communication channels between said selected mobile subscriber station and at least one base station in said cellular communication system.

14. The method of operating a cellular communication system of claim 13 wherein said step of processing further comprises:

assigning each of said radio communication channels to a corresponding one of said desired plurality of call components.

15. The method of operating a cellular communication system of claim 10 wherein said step of processing comprises:

establishing a plurality of radio communication channels between said selected mobile subscriber station and at least one base station in said cellular communication system.

16. The method of operating a cellular communication system of claim 15 wherein said step of processing further comprises:

assigning each of said radio communication channels to a corresponding one of said plurality of call components.

17. The method of operating a cellular communication system of claim 10 wherein said cellular communication system is connected to a plurality of switching systems, each of which serves to transmit data of a predetermined type, said step of processing comprises:

selecting a one of said plurality of said plurality of switching systems for each of said plurality of call components to establish a plurality of simultaneous communication connections; and interconnecting each of said call components from said selected mobile subscriber station to a corresponding selected one of said plurality of said plurality of switching systems.

18. The cellular communication system of claim 10 wherein said step of processing comprises:

determining a destination for each of a plurality of voice communication connections; and initiating establishment of said plurality of communication connections to said destination for each of said plurality of voice communication connections.

* * * * *